«12» United States Patent
Holmes et al.

(10) Patent No.: US 7,538,457 B2
(45) Date of Patent: May 26, 2009

(54) ELECTRIC MOTOR ASSEMBLIES WITH COOLANT FLOW FOR CONCENTRATED WINDINGS

(75) Inventors: Alan G. Holmes, Clarkston, MI (US); Richard A. Ordo, Greenwood, IN (US); Ahmed M. El-Antably, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 203 days.

(21) Appl. No.: 11/341,778

(22) Filed: Jan. 27, 2006

(65) Prior Publication Data

US 2007/0176499 A1    Aug. 2, 2007

(51) Int. Cl.
   *H02K 3/24* (2006.01)
(52) U.S. Cl. .......................... 310/54; 310/57
(58) Field of Classification Search .................. 310/52, 310/54, 57, 64
   See application file for complete search history.

(56) References Cited

U.S. PATENT DOCUMENTS

| | | | | |
|---|---|---|---|---|
| 4,207,550 A | * | 6/1980 | Daikoku et al. .................. 336/60 |
| 4,228,375 A | * | 10/1980 | Beermann et al. ............ 310/214 |
| 5,365,135 A | * | 11/1994 | Konrad et al. ................. 310/214 |
| 6,515,384 B1 | * | 2/2003 | Kikuchi et al. .................. 310/58 |
| 6,577,027 B2 | * | 6/2003 | Hayase et al. ................... 310/59 |
| 6,700,283 B2 | * | 3/2004 | Kikuchi et al. ............... 310/214 |
| 6,713,927 B2 | * | 3/2004 | Kikuchi et al. ............... 310/214 |
| 6,856,053 B2 | * | 2/2005 | LeFlem et al. .................. 310/54 |
| 6,933,633 B2 | * | 8/2005 | Kaneko et al. .................. 310/52 |
| 2002/0180284 A1 | * | 12/2002 | LeFlem et al. .................. 310/54 |
| 2004/0100154 A1 | * | 5/2004 | Rahman et al. ................. 310/54 |
| 2005/0200212 A1 | * | 9/2005 | Lima ............................ 310/59 |
| 2006/0043801 A1 | * | 3/2006 | Adra ............................ 310/54 |
| 2007/0176499 A1 | * | 8/2007 | Holmes et al. .................. 310/54 |

* cited by examiner

*Primary Examiner*—Dang D Le

(57) ABSTRACT

The present invention relates to a cooling system and method for the concentrated motor stator windings of an electric motor. The cooling system and method provides coolant directly onto the motor stator windings and between each adjacent stator winding. The motor housing assists in distributing coolant between each stator winding of the electric motor assembly. Moreover, an insulated sheet and/or tube is insertable between the concentrated motor stator windings. Each is configurable to direct coolant directly on to the stator windings.

6 Claims, 3 Drawing Sheets under the several views, FIGS. 1-6 show an electric motor assembly and a cooling system for the motor.

ELECTRIC MOTOR ASSEMBLIES WITH COOLANT FLOW FOR CONCENTRATED WINDINGS

TECHNICAL FIELD

The present invention relates to a cooling system for an electric motor assembly having concentrated stator windings and a means for distributing coolant directly onto the motor windings.

BACKGROUND OF THE INVENTION

Electric motors typically consist of a stator surrounding a substantially cylindrical rotor fixed to a shaft. The stator may have concentrated windings, typically consisting of copper wires coiled tightly around individual iron teeth extending inward toward the rotor. This type of stator winding construction results in relatively short end turns on the windings, as compared with distributed windings. Only a small amount of length along the axis of the motor must then be devoted to winding end turns, and most of the length can include stator teeth and be directly useful for producing torque.

Electro-mechanical transmissions generally require the use of two electric motors to transmit power to the output shaft of the transmission. Electric motors can generate a substantial amount of heat during operation. Electric motors with concentrated motor windings often generate more heat than motors with distributed windings and can be more susceptible to overheating which can lead to less efficient performance. Cooling the electric motor can positively influence motor efficiency and continuous torque. The performance issues include motor drag, motor parasitic losses in the coolant pumping, motor winding resistance, spin losses, and power rating.

Air or oil is most commonly used to carry heat away from the electric motors. Electric motor cooling can strongly influence transmission packaging and mass in vehicles. A motor cooling system incorporated into an electromechanical transmission should not substantially increase the axial or radial space required for the electric motor as space available for vehicle transmissions can be very limited.

SUMMARY OF THE INVENTION

The present invention relates to a cooling system for an electric motor assembly configured to supply coolant directly onto the concentrated stator windings of the assembly to increase system efficiency. The motor assembly includes a motor housing configured with an inlet and outlet portion operative to guide coolant across the motor stator windings.

In one embodiment, an insulated sheet is inserted between adjacent motor stator windings. In an alternative arrangement of the same embodiment the insulated sheet is hollowed to provide for at least one axially extending tube in the insulated sheet.

In another embodiment, a tube is inserted between the motor stator windings and is operable to guide the coolant directly onto the sides of the stator windings.

More specifically, an electric motor assembly has circumferentially arranged adjacent concentrated motor stator windings which are spaced to define at least one channel for passing coolant in heat transfer relationship to the windings. A motor housing is configured to cover the motor stator windings and an insert is fittable between the motor stator windings and configured to guide coolant flow from within the channel directly onto the motor stator windings.

Additionally, the present invention includes an electric motor assembly with a motor housing configured for receiving coolant, a rotor, and a plurality of axially extending concentrated motor stator windings circumferentially arranged in the motor housing around the rotor in air gap relationship to the rotor. Each pair of the stator windings are spaced apart to define a channel between the stator windings for distributing coolant received by the housing in heat transfer relationship with the stator windings. Moreover, a coolant retainer is included which is configured to sufficiently enclose the channel at the air gap with the rotor so that the coolant is directed axially, with respect to the electric motor assembly, along the stator windings for removing waste heat directly from the stator windings.

Moreover, a method of cooling a high-performance hybrid electric vehicle motor is included with the present invention. The method includes: concentrating the stator wiring of the electric motor into a plurality of circumferentially arranged wiring coils defining concentrated motor stator windings; spacing one of the concentrated motor stator windings from an adjacent other of the concentrated motor stator windings to form a channel; and flowing coolant through the channel at sufficient speed and resistance to transfer heat from the concentrated motor stator windings to the coolant.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
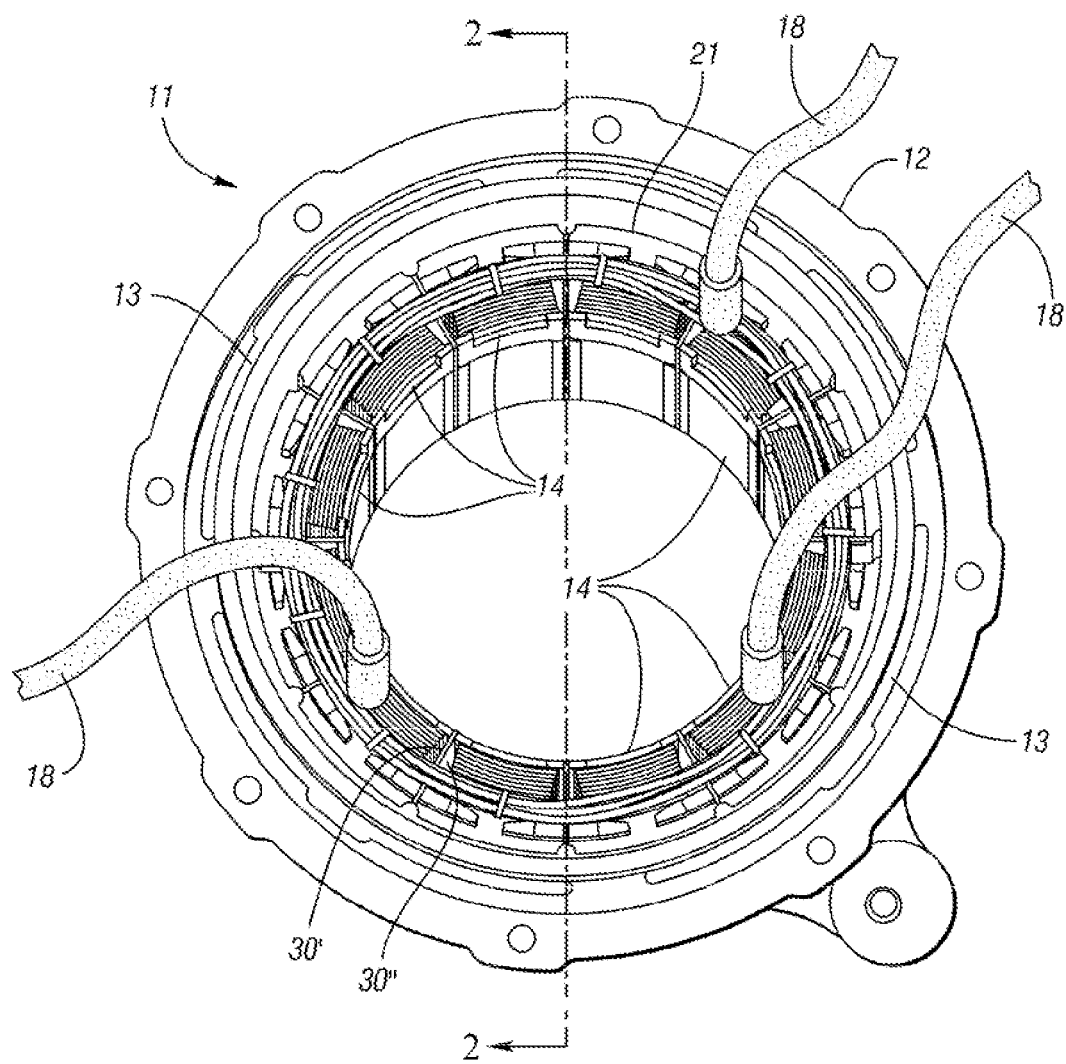
FIG. 1 is an axial perspective view of the stator portion of an electric motor assembly having circumferentially arranged adjacent concentrated motor stator windings in a motor housing which are spaced apart to form cooling channels in accordance with the invention.
Figure 2:
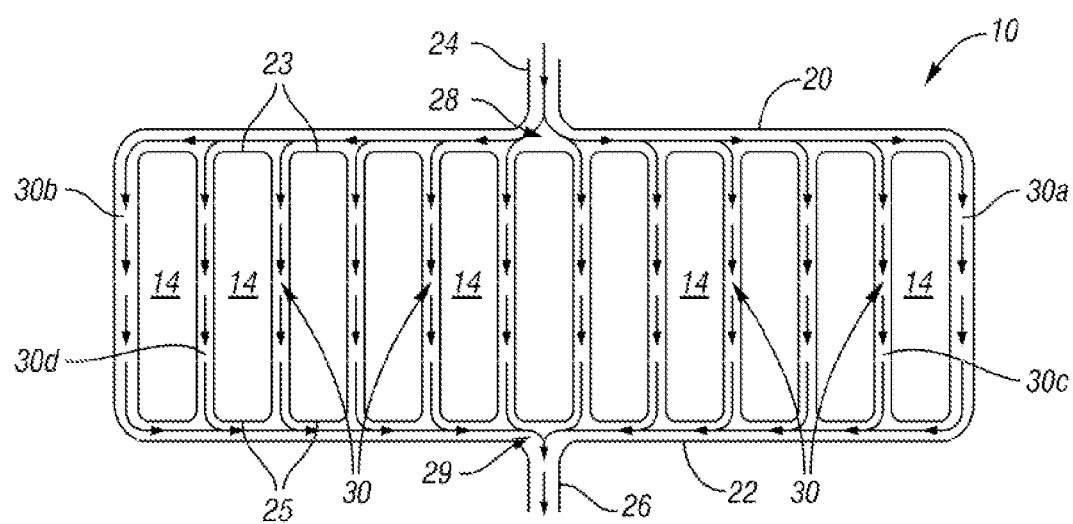
FIG. 2 is a schematic unwrapped view of the concentrated windings of FIG. 1 with parts broken away to show end-to-end stator coolant flow for illustrating flow resistance in manifold portions of the motor housing as compared to the channel portions.
Figure 3:
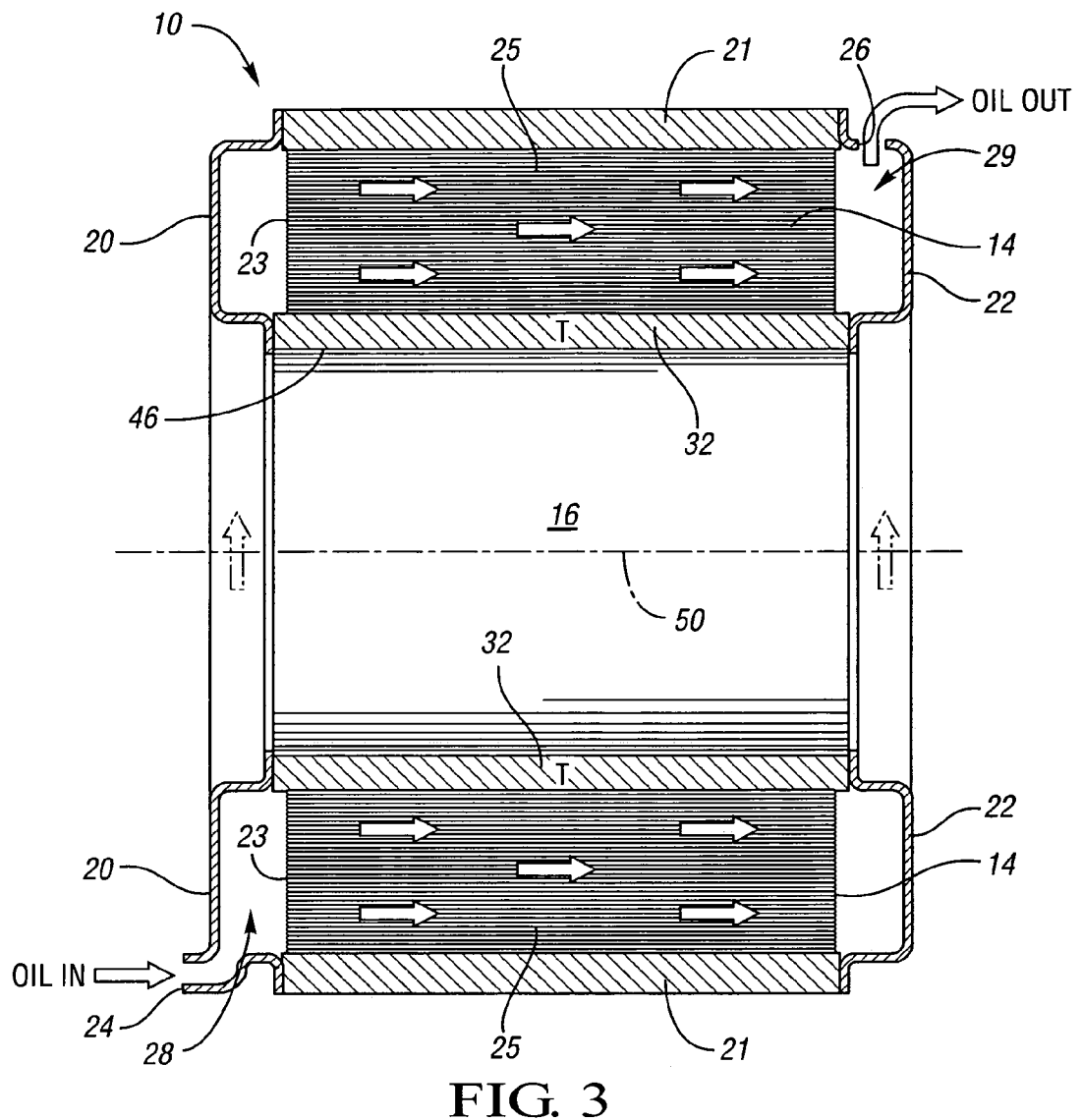
FIG. 3 is a schematic cross-sectional view of the invention, including a motor rotor, and illustrating axial coolant flow between the manifold portions and the concentrated motor stator windings.

Referring to the drawings, FIGS. 1 through 6, wherein like characters represent the same or corresponding parts throughout the several views there is shown in FIG. 1 an axial view of the stator portion 11 of an electric motor assembly 10 as shown in FIG. 3. Fundamentally, the present invention relates to an electric motor assembly 10 having circumferentially arranged adjacent concentrated motor stator windings 14 spaced to define at least one stator channel 30 therebetween for coolant passage (as illustrated in FIGS. 2, and 4-6). A motor housing 12 is configured to cover and support the motor stator windings 14. An insertable sheet such as 38 as shown in FIGS. 5a-c is fittable in each channel between the motor stator windings 14 and is configured to divide each channel 30 so as to guide coolant within each channel 30 directly onto the respective motor stator windings 14 which flank or lay on opposite sides of sheet 38.

Particularly, FIG. 1 illustrates the stator portion 11 of the electric motor assembly 10 as shown in FIG. 3, which includes a motor housing 12 and concentrated motor stator windings 14. The motor housing 12 includes axially extending slots 13 for fluid passage, to cool the stator portion 11 of the electric motor assembly 10. Electrical supply lines 18 are arranged to supply electric power to the stator windings 14. During operation, the concentrated motor stator windings 14 transport electric current to generate a magnetic field. Alternative arrangements may be employed to accomplish powering the electric motor assembly 10.

Figure 4:
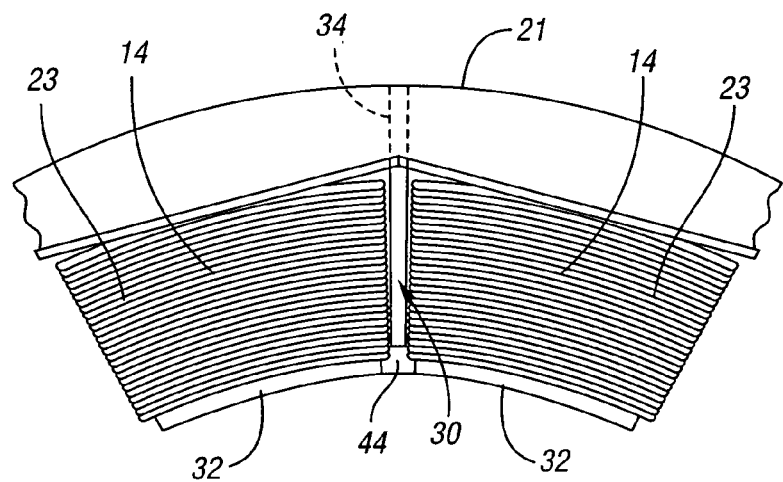
FIG. 4 is a fragmentary schematic end view of a pair of the circumferentially arranged concentrated motor windings spaced to form a channel for distributing coolant between the motor windings.
Figure 5A:
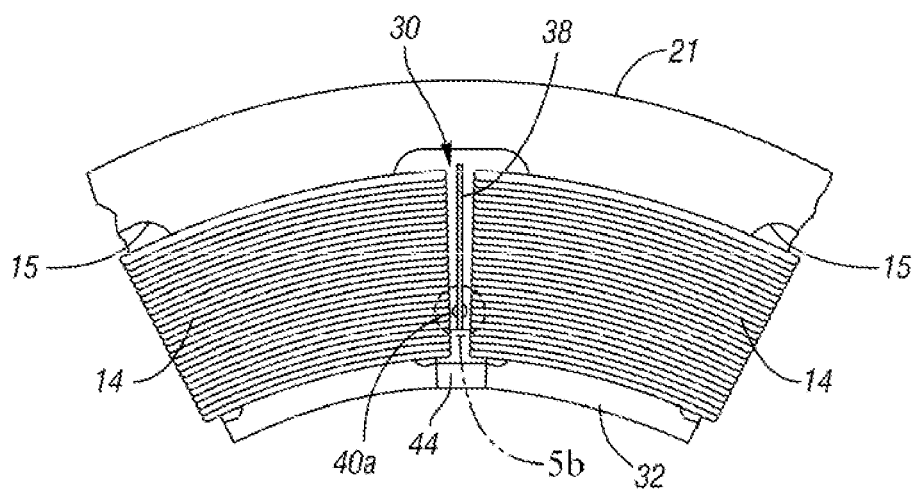
FIGS. 5a-c are fragmentary enlarged schematic views of different inserts for the channels formed between the circumferentially arranged concentrated motor windings which are configured to obtain the desired turbulence or flow resistance in the channel between the windings, whereby to achieve a desired heat transfer between the coolant and the windings.
Figure 5B:
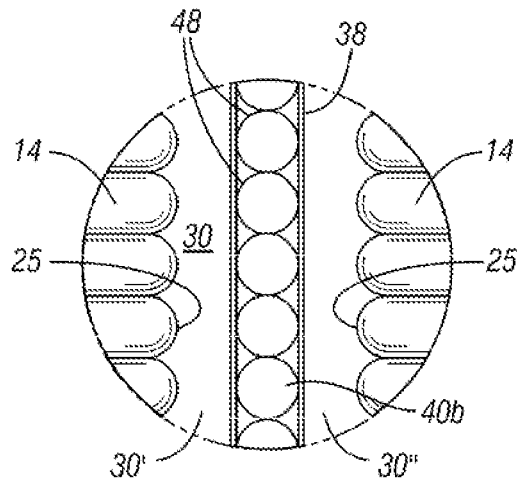
Figure 5C:
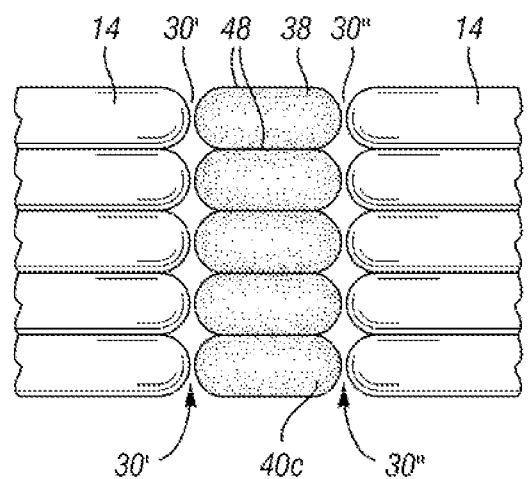
Figure 6:
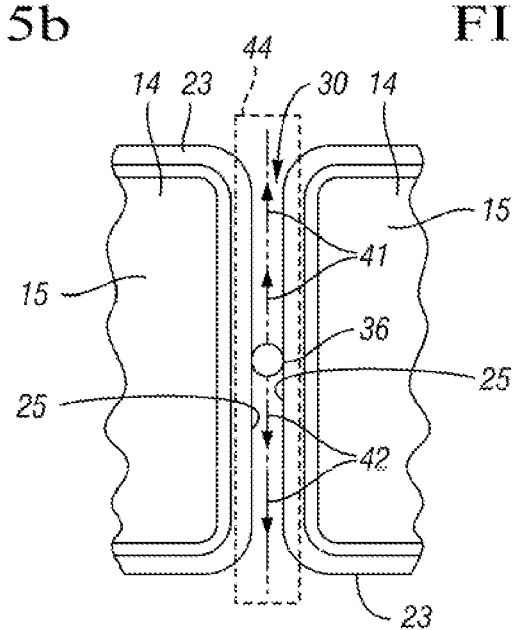
FIG. 6 is a fragmentary enlarged schematic radial view of an alternate embodiment of the invention, illustrating axial coolant flow from a central hole or tube to the ends turns of motor windings.

The concentrated windings 14 are wound on individual poles 15 (as shown in FIGS. 5a and 6). Multiple windings 14 at least partially define the stator portion 11 of the electric motor assembly 10. The placement and size of the winding coils are closely controlled in the concentrated winding arrangement. The winding sides 25 as shown in FIGS. 2-3, 5b and 6 are spaced to define a channel 30 between the windings 14 on adjacent poles 15. In this regard, the placement and size of the coils may be closely controlled so that oil is retained largely or partly by "capillary" attraction to the winding sides 25 or walls at operating temperatures. A sheet 38 of electrically insulated material may also be placed between the adjacent windings along the center of each stator channel 30 to split the channel into two parallel passages 30', 30" as shown in FIGS. 1, 5b-c. This invention uses the channel 30 or pair of channels 30', 30" between each pair of adjacent windings to enable cooling oil to flow in a heat transfer relationship through the motor windings 14, thereby removing waste heat directly from the windings. This system allows oil to contact a larger surface area of the windings than spraying on the end turns 23 (as shown in FIGS. 2-4 and 6) of the windings 14, thereby effectively cooling the electric motor assembly (shown in FIG. 3) with a minimum number of additional parts. This system also provides substantially even distribution between each pole 15 although the orientation of the channel 30 and the inserts 38 therein may vary.

Oil flow from each end of the stator portion 11 is accomplished or defined by the use of two end covers or coolant retainers (20, 22 respectively) on opposite ends of the electric motor assembly 10. Additionally, an internal sleeve 32 (or stator "shoes") and an external sleeve 21 (or stator "back iron" which may be part of the motor housing 12) enclose the stator portion 11 or the electric motor assembly 10 for retaining oil. The oil is introduced on one end of the motor assembly 10 through an inlet aperture 24 (as shown in FIG. 2) into an annular inlet chamber 28 formed between the end cover 20 and the end turns 23 of the concentrated windings 14. After flowing around the inlet chamber 28 and passing in heat transfer relationship to the winding sides 25, flanking each channel 30, the oil flows around the outlet chamber 29 formed by the other end cover 22 and the end turns 23. Finally, the coolant leaves the enclosure at the opposite axial end of the stator portion 11 of the motor assembly 10 so that air is flushed out of the system. Even distribution of the oil is maintained by creating even flow paths around the circumference of the stator portion 11 and between the end turns 23 of the windings 14.

With reference to FIG. 2 much less flow resistance is seen in the end covers 20, 22 and their cavities 28, 29 than occurs in the flow areas along the winding sides 25 in channel 30 and segmented channels 30' and 30" through the spaces between adjacent pairs of windings 14. The larger the inlet cavity 28 the less resistance to flow around and throughout the cavity. Likewise, the breadth or size of each channel 30 affects the resistance to flow in each channel. The motor stator windings 14 are spaced to define a small channel 30 between each stator winding. The smaller the channel 30 the more resistance to flow there through. However, if the stator windings are widely spaced fluid will face less resistance and be more apt to flow between the stator windings 14. With reference to the schematic flow arrangement of FIG. 2, the motor assembly is configured to evenly disperse fluid thorough the inlet cavity 28 and into each channel (for example, 30a, 30b, 30c, 30d, etcetera.) defined between each pair of adjacent stator windings 14. This is accomplished by enlarging or extending the inlet end cover portion 20 (FIG. 3) of the motor housing thereby decreasing the fluid's resistance to flow in the inlet cavity 28. In the shown embodiment, fluid flows around the inlet cavity 28 and through circumferentially adjacent channels 30—two of which are shown in FIG. 3 as the side turns 25 of respective stator windings 14. A higher resistance to flow in stator channels 30 than the inlet cavity 28 enables the coolant to disperse evenly from the inlet cavity 28 through the various stator channels 30. Those stator channels 30 most proximate to the inlet aperture 24 will be configured to resist flow there through more so than those stator channels 30 more remote from the inlet aperture. This enables even flow through all the channels like 30a, 30b, 30c, 30d, etcetera. Thus those channels closest to inlet aperture 24 will have substantially the same flow as those channels more distant from the inlet aperture 24 of the motor assembly 10. In the preferred embodiment, even distribution of air or fluid can be accomplished by configuring the inlet cavity 28 (or manifold) with a low flow resistance as compared to the twelve channels 30 between windings 14. For example, if there is one unit of flow resistance in the annular inlet cavity 28 from the inlet aperture 24 to the farthest channel 30a and 30b and nine units of flow resistance in such channels 30a and 30b, this would make eleven units of flow resistance total along the flow path. Such balancing of flow resistance will lead to even flow among all the channels 30.

FIG. 3 further illustrates the inlet and outlet end cover portions 20 and 22 of the motor housing which define an inlet and outlet cavity (28 and 29 respectively) through which fluid passes in heat transfer relationship against the end turns 23 of the motor assembly 10. The cavities (28 and 29) are partially defined by an internal sleeve 32, as shown in FIG. 3, configured to prevent cooling oil from flowing from the inlet and outlet cavities (28 and 29) onto the rotor 16. Fluid is supplied across the motor windings 14 between cavities (28 and 29) and along the passages 30 to transfer heat from the stator windings 14 of the electric motor assembly. The sealing of fluid in the predetermined areas of motor assembly between the windings and the rotor provides a closed system to enable efficient heat transfer flow between the stator windings 14. Moreover, the low inlet and high outlet apertures (24 and 26) shown in FIGS. 2 and 3 enable air to be flushed out of the coolant system of the electric motor assembly 10.

In another coolant flow embodiment of the present invention and with reference to FIGS. 4 and 6, oil flow is introduced through a set of central radial apertures 34 through the external sleeve 21 (or "back iron") around the circumference of the stator windings. Preferably aperture 34 is axially centered with respect to adjacent motor stator windings 14 and aligned with channel 30, as shown in FIGS. 4 and 6. The geometry or configurations of the aperture 34 and the respective flow passages within the slots or channels 30 are such that the flow rate is similar through each of the apertures 34. The cooling oil is retained by the spacing formed between the windings relative to one another or relative to the insulation sheet 38 or barrier which may be used to sufficiently divide the space 30 into two passages 30' and (as shown in FIG. 1) 30" so that, at operating temperature, the oil is kept in heat transfer relationship against the windings 14 on each side of the passage by the viscosity and surface tension of the oil. The cooling oil is then redirected in the axial direction along the sides 25 of the stator by dam 44 (FIG. 4). Alternatively, internal sleeve 32 (or "stator teeth") may be configured to close the channels 30 between the shoes 32 at the air gap 46 or between the rotor 16 and the stator portion 11 and may extend along the motor axis 50 and around the stator teeth, T, to keep oil from falling onto the ends of the rotor 16. Such a coolant retainer is configured to sufficiently enclose the channel 30 at the air gap so that the coolant is directed axially along the stator windings 14 for removing waste heat directly from the stator windings. The insulation sheet 38 may optionally be one part with the air gap dam 44. Alternatively, a small tube 36 may be insertable in a channel 30. The tube has several small orifices at its outer perimeter to allow for controlled fluid passage from the perimeter of the tube 36 (illustrated by flow arrows 41 and 42).

This system may be further embodied by the choice of sheet 38 material and/or configuration which may be inserted to split each channel 30. For instance, the electrical insulation may in fact consist of a hollowed sheet 38 (as shown in FIG. 5b) and may have deformable material (as shown in FIG. 5c) so that much of the space between the adjacent windings will be filled by the bulk of the insulator sheet 38. Alternatively, the hollowed sheet 38 may be filled with a sufficiently thick structure to reduce the thickness of channels 30' and 30", whereby to increase speed or flow resistance within the channels (30', 30"). In such an embodiment, only a small layer or flow space remains in channels 30' and 30" for the flow of oil, effectively increasing its velocity and its retention (or dispersion) depending upon the viscosity and surface tension of the oil (or coolant). Also, in such an embodiment, deformable material allows oil to flow past in the segmented channels 30' and 30", which could not be easily made within manufacturing tolerances for inexpensive work. In this way, even if the size of the windings 14 varies during manufacture a continuous layer of oil is still maintained along the windings.

The sheet 38 may be composed of a variety of materials not limited to those discussed herein. For example, another choice for an insulation sheet 38 is a closed-cell foam (not shown). The insulating sheet may have a hollow structure or other thick configuration that is sufficiently thick so to reduce the thickness of the oil passage to a size comparable to the segmented channel 30 whereby to increase the speed and/or flow resistance of the coolant oil. Yet another material selection for the insulation sheet 38 is a coarse felt or open-cell foam with the felt or foam serving to retain the oil and to help improve conditions of transferring heat into the oil. In this regard, the insulation sheet 38 may have a formed pattern of sheet material and may consist of folded fins such as a typical heat exchanger but with small enough passages, especially at the ends to retain the oil sufficiently so the oil flows at the desired flow rates and temperatures of operation. In short, the insulating sheet 38 between the concentrated windings may have structural features which provide turbulence for more heat transfer.

The concentrated windings 14 are preferably composed of a copper wiring. The copper wiring is nestably wound for a shorter or more concentrated travel path. Concentrated motor windings generate more power than non-concentrated windings since the electrical current traveling therein travels through more wire in the concentrated arrangement. However, concentrated wiring also generates more heat, not only as a result of the additional current travel, but also because of the close proximity of the wiring, which radiates thermal energy.

The insulated sheets 38 may be secured between the external sleeve 21 and the internal sleeve 32 of the motor assembly 10 extend between the inlet cavity 28 and outlet cavity 29 (FIG. 2). The insulated sheet 38 defines a wall between each winding in each pair of adjacent stator windings 14. In an additional embodiment, the insulated sheet 38 is hollowed to accommodate a deformable material (40a, 40b, and 40c) to cause more turbulent fluid passage. The insulated sheet 38 includes at least one and preferably multiple axial tubes 48 which are filled with the deformable material (40a, 40b, and 40c). The insulated sheet 38 is deformable by the deformable material (40a, 40b, and 40c) and may define a rough surface to accomplish this.

This invention also includes a method of cooling a high-performance hybrid electric vehicle motor. In this method the stator wiring of the electric motor is concentrated into a plurality of circumferentially arranged wiring coils, which define concentrated stator windings. The concentrated motor stator windings are spaced from each other to flow through the channel at sufficient speed and resistance to transfer heat from the concentrated stator windings to the cooling oil.

While the best modes for carrying out the invention have been described in detail, those familiar with the art to which this invention relates will recognize various alternative designs and embodiments for practicing the invention within the scope of the appended claims.

The invention claimed is:

1. An electric motor assembly, comprising:
    circumferentially arranged adjacent concentrated motor stator windings spaced to define at least one channel for coolant passage;
    a motor housing configured to cover said motor stator windings wherein said motor housing defines an inlet and outlet portion operative to cover an end turn of said concentrated motor stator windings;
    wherein said inlet portion defines an inlet chamber operable to distribute coolant to the end turn of said concentrated motor stator windings;
    wherein said outlet portion defines an outlet chamber operable to distribute coolant away from the end turn of said concentrated motor stator windings;
    an insert fittable between said motor stator windings configured to guide coolant flow within said channel directly onto said motor stator windings, wherein said insert is spaced apart from said inlet portion and from said outlet portion to allow coolant flow therein, wherein said insert is an insulated sheet insertable in said at least one channel of said concentrated motor stator windings and operable to split coolant flow between adjacent motor stator windings; and
    at least one axially extending tube in said insulated sheet wherein said insulated sheet is hollowed, and filled with a deformable material configured to promote retention of coolant between said insulated sheet and said concentrated motor stator windings by surface tension of said coolant.

2. The motor assembly of claim 1, wherein said inlet and outlet portion of said motor housing further defines an inlet aperture and outlet aperture operative to respectively facilitate the passage of coolant into said motor housing and the passage of coolant from said motor housing.

3. The motor assembly of claim 1, wherein said motor housing includes an external sleeve configured to cover said motor stator windings; wherein said tube communicates through said external sleeve of said motor housing.

4. The motor assembly of claim 1, wherein said at least one axially extending tube is configured in a manner to deform an outer surface of said insulated sheet thereby increasing the turbulence of said coolant as it passes between said concentrated motor stator windings and said insulated sheet.

5. The motor assembly of claim 1, wherein said motor housing includes an external sleeve and said insert is secured to said external sleeve.

6. The motor assembly of claim 1, wherein an internal sleeve is located within said motor housing and said insert is secured to said internal sleeve.

\* \* \* \* \*